(12) United States Patent
VanBlon et al.

(10) Patent No.: US 9,484,003 B2
(45) Date of Patent: Nov. 1, 2016

(54) CONTENT BOUND GRAPHIC

(71) Applicant: Lenovo (Singapore) Pte. Ltd., Singapore (SG)

(72) Inventors: Russell Speight VanBlon, Raleigh, NC (US); Karen Ruth Kluttz, Raleigh, NC (US); Ryan Patrick McShane, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 510 days.

(21) Appl. No.: 13/632,637

(22) Filed: Oct. 1, 2012

(65) Prior Publication Data

US 2014/0092143 A1    Apr. 3, 2014

(51) Int. Cl.
*G09G 5/00*     (2006.01)
*G09G 5/34*     (2006.01)
*G09G 5/36*     (2006.01)
*G06F 3/0485*   (2013.01)

(52) U.S. Cl.
CPC .............. *G09G 5/34* (2013.01); *G06F 3/0485* (2013.01); *G09G 5/346* (2013.01); *G09G 5/363* (2013.01); *G09G 2354/00* (2013.01)

(58) Field of Classification Search
None
See application file for complete search history.

(56) References Cited

U.S. PATENT DOCUMENTS 8,219,752 B1    7/2012  Jenkins et al.
8,275,874 B2    9/2012  Sivasubramanian et al.
2008/0092077 A1*  4/2008  Mather et al. ............... 715/781
2011/0055713 A1*  3/2011  Gruenewald et al. ........ 715/738
2012/0256949 A1* 10/2012  Treat et al. .................. 345/629
2013/0033523 A1*  2/2013  Stovicek et al. ............. 345/649

OTHER PUBLICATIONS

Amazon Technologies, Inc., KINDLE User's Guide, 2nd Edition, 2007 (89 pages).
Microsoft Corp., WINDOWS 8 Release Preview, Product Guide for Developers, 2012 (9 pages).
Microsoft Corp., ScrollViewer Class (http://msdn.microsoft.com/en-us/library/system.windows.controls.scrollviewer%28v=vs.110%29.aspx), .Net Framework Version 4.5, release date Aug. 2012 (20 pages).
Microsoft Corp., GridView Class (http://msdn.microsoft.com/en-us/library/system.windows.controls.gridview%28v=vs.110%29.aspx), .NET Framework Version 4.5, release date Aug. 2012 (5 pages).
Microsoft Corp., ScrollViewer Class, Windows Store API, ScrollViewer class (http://msdn.microsoft.com/en-us/library/windows/apps/br209527.aspx), Sep. 2012 (16 pages).
Microsoft Corp., GridView Class, Windows Store API, GridView class (http://msdn.nnicrosoft.com/en-us/library/windows/apps/windows.ui.xaml.controls.gridview.aspx), Sep. 2012 (15 pages).

* cited by examiner

*Primary Examiner* — James A Thompson
*Assistant Examiner* — Xilin Guo
(74) *Attorney, Agent, or Firm* — Brian J. Pangrle

(57) ABSTRACT

A method can include accessing content stored in a data store where the content includes a bound and content adjacent to the bound; rendering a portion of the content to a display; receiving a scroll command that calls for rendering the content adjacent to the bound; and, responsive to receipt of the scroll command, rendering a bound graphic. Various other apparatuses, systems, methods, etc., are also disclosed.

20 Claims, 9 Drawing Sheets

US 9,484,003 B2

CONTENT BOUND GRAPHIC

TECHNICAL FIELD

Subject matter disclosed herein generally relates to technology for display of content.

BACKGROUND

Various types of devices can render content to a display or displays. For example, a mobile phone, a tablet device, a notebook computer, a desktop computer, etc., may render content to a display (e.g., which may be integral or otherwise operatively connected). Various technologies and techniques described herein pertain to technology for display of content.

SUMMARY

A method can include accessing content stored in a data store where the content includes a bound and content adjacent to the bound; rendering a portion of the content to a display; receiving a scroll command that calls for rendering the content adjacent to the bound; and, responsive to receipt of the scroll command, rendering a bound graphic. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

Figure 1:
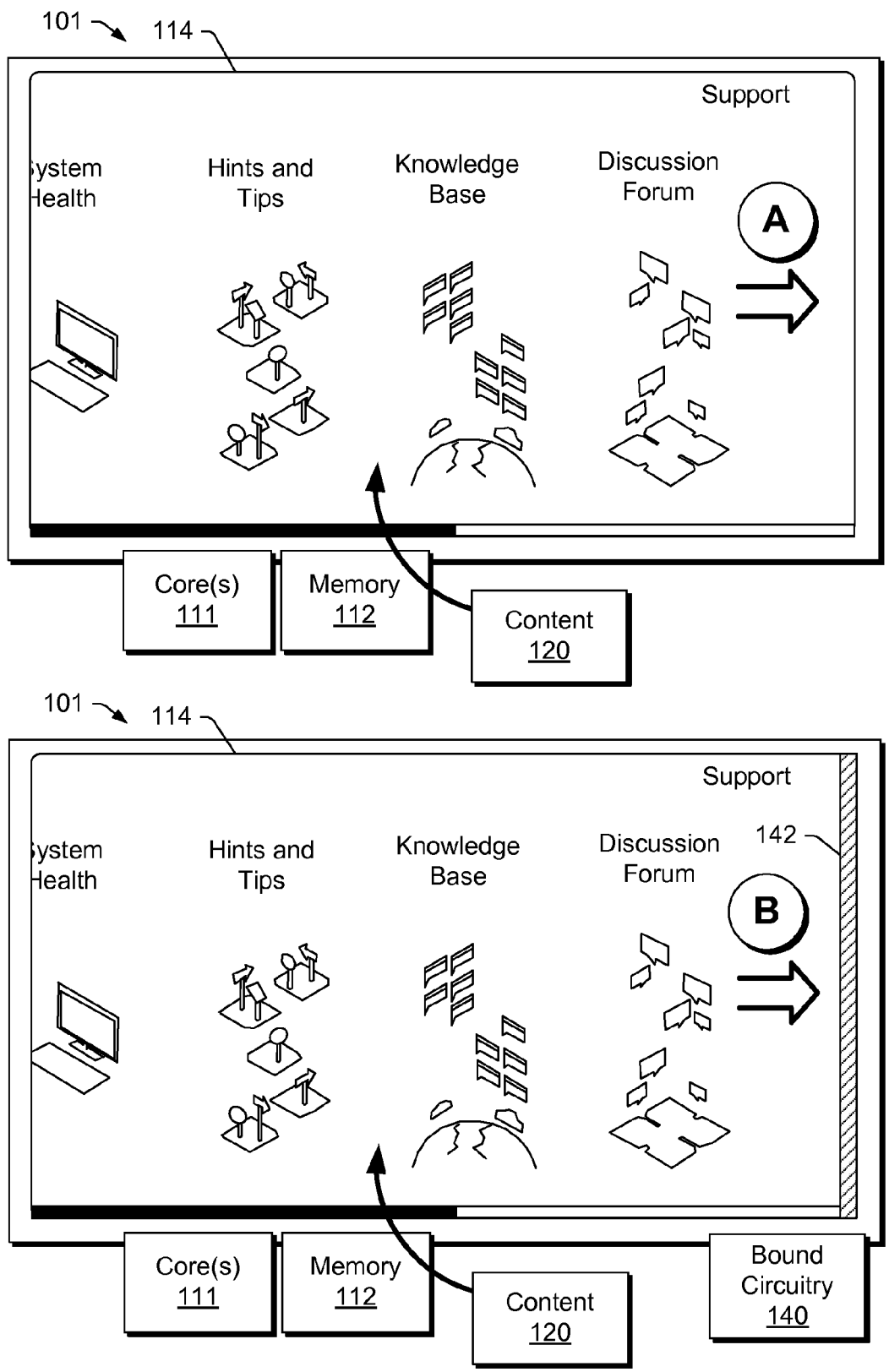
FIG. 1 is a diagram of an example of a device that includes a display for display of content with respect to two scenarios.

The following description includes the best mode presently contemplated for practicing the described implementations. This description is not to be taken in a limiting sense, but rather is made merely for the purpose of describing general principles of various implementations. The scope of invention should be ascertained with reference to issued claims.

As mentioned, various types of devices can render content to a display. As an example, consider an application, executable by a processor of a device, that calls for rendering of content by the device to a display. In such an example, depending on the amount, type, etc., of the content, at least a portion of the content may be "fit" to the display. For example, consider a webpage with 10,000 words accessed by a tablet device having a diagonal screen size of about 9 inches. For the given screen size, about 200 to about 400 words may be considered acceptable for a user to read the words. In such an example, if a "page" size is assumed to be 200 words, the 10,000 words of the webpage would fill 50 pages. Where a scroll control exists for the device, a user may actuate the scroll control to cause the device to access certain portions of the content (e.g., page back, page forward, etc.) and render it to the display.

The foregoing example may be considered to be somewhat "freeform" as to how the content is provided or organized. As an example, where the scroll control is a touch screen, a user may successively touch the touch screen with swiping motions to call for rendering of portions of content forward or reverse from currently displayed content. In such an example, a user may abruptly reach a bound for the content or a portion thereof. A bound may be, for example, due to end of the content (e.g., end of the 10,000 words), due to end of content in local memory (e.g., only 2,000 of 10,000 words downloaded into local memory), etc. An abrupt "end" (e.g., a bound hit) may be detrimental to a user's experience. Various techniques, technologies, etc., described herein may improve a user's experience, for example, by calling for rendering of a bound graphic. Such a graphic may be readily noticeable and provide a user with an indication that an end of content (e.g., a bound) has been reached.

As an example, a device may include bound circuitry that may, for example, be implemented with respect to an application as a component of the application (e.g., part of application code, a plug-in, etc.). As an example, bound circuitry may be implemented as a "shell" in which content is directed for rendering or co-rendering. As an example, bound circuitry may be provided as a module for implementation with a framework such as an operating system framework.

As an example of an operating system framework, consider the WINDOWS® 8 operating system framework (Microsoft Corporation, Redmond, Wash.), which includes features for a "style" of application referred to as "Windows Store apps" or "Metro apps" (e.g., "Metro-style apps"). The aforementioned framework intends to allow such apps to provide a "fast and fluid" user experience (e.g., optimization for touchscreen environments, smaller scope in relation to desktop applications, etc.). As to user access to such apps, some may be distributed and updated through a distribution platform (e.g., "Windows Store", "App Store", "Google Play", etc.), for example, which may be associated with one or more operating systems (e.g., Apple OSs, Google OSs, etc.).

As to the aforementioned WINDOWS® framework, apps may run within a set of application programming interfaces (APIs) known as the Windows Runtime (WinRT) (e.g., with support of various programming languages, scripts, etc., such as C, C++, VB.NET, C#, HTML5, JavaScript, etc.).

FIG. 1 shows an example of a device 101 in a first scenario (A) and a second scenario (B) where, in the second scenario (B), the device 101 includes bound circuitry 140. As shown in FIG. 1, the device 101 includes one or more cores 111, memory 112 and a display 114. Content 120 may be stored in the memory 112 and rendered to the display 114. The content 120 may be received via one or more sources. For example, a network may be a source of the content 120 (e.g., via a data store, a camera, content generator, etc., in communication with the network), a memory storage device may be a source of the content 120, etc. As to the memory 112, it may include graphics memory for storing information renderable to the display 114 (e.g., consider a "frame buffer"). As an example, one or more of the one or more cores 111 may be a graphics core (e.g., a core of a GPU, a graphics-dedicated core of a CPU, etc.).

In the scenarios A and B of FIG. 1, a portion of the content 120 is rendered to the display 114. In the example of FIG. 1, the content pertains to a support application, which can include items of content where the number of items (e.g., arranged in columns) does not readily "fit" the display 114 (e.g., according to device settings, application settings, etc.). While the example of FIG. 1 shows items in columns in a landscape orientation, other arrangements are possible such as rows in portrait or landscape orientations, columns in a portrait orientation, combinations of rows and columns, etc.

As shown in the example of FIG. 1, the portion of the content 120 rendered to the display 114 is adjacent to a bound (e.g., an end of the content 120). In the scenario A, a user scrolling through the content 120 (e.g., entering commands that cause scrolling to the right) causes rendering of the content adjacent to the bound. In scenario A, the user may arrive at that bound abruptly, which may be detrimental to the user's experience. In the scenario B, the bound circuitry 140 causes rendering of a bound graphic 142 to the display 114 that serves as a visual indicator to the user that a bound of the content 120 has been reached. As an example, where a device changes orientation, bound circuitry or other circuitry may automatically change orientation of a bound graphic (e.g., optionally along with one or more settings, which may be associated with orientation-related controls, etc.).

As an example, the bound graphic 142 may be a color graphic. As an example, a color graphic may be red. As an example, a color may be determined for a color graphic by the bound circuitry 140 responsive to one or more colors, intensities, etc., of the content 120, or portion thereof, being rendered to the display 114. For example, if the portion of the content 120 adjacent to a bound has a red background, the bound circuitry 140 may select a color other than red for the bound graphic 142. For example, the bound circuitry 140 may include a color table. As an example, the bound circuitry 140 may include a model (e.g., optionally a color table, one or more functions, etc.). As an example, the bound circuitry 140 may include a model to select a complementary color to a color of content adjacent to a bound of the content. Complementary colors may be defined as pairs of colors that are of "opposite" hue in some color model. The exact hue "complementary" to a given hue may depend on the model in question, and perceptually uniform, additive, and subtractive color models, for example, have differing complements for a given color. As an example, bound circuitry may include a default color for a bound graphic and an algorithm to determine whether to call for rendering of a different color (e.g., depending on contrast with respect to one or more complementary parameters, etc.).

As an example, the bound graphic 142 may include shading, hatching, transparency, etc. In the example of FIG. 1, the hatching may represent a color, shading, or other visual effect. As an example, a bound graphic may be active with respect to time. For example, a bound graphic may be rendered with a snap effect (e.g., a shifting back-and-forth with respect to time), a stretch effect (e.g., an increase in pixel width), or other time effect. As an example, a bound graphic may include a visual effect within the graphic itself (e.g., color change, intensity change, etc.). As to time-related effects, rates, maxima, minima, etc., may be parameters of bound circuitry, which may be set by a user, an application, etc. As an example, rate of a time-related effect may correspond to rate of an input signal such as a swipe input on a touch control (e.g., display, touchpad, etc.).

As an example, a bound graphic may be a graphical user interface (GUI). For example, the bound graphic 142 may allow for selection via a tap, a click, a voice command, etc., which calls for one or more actions. As an example, an action may be issuance of a call for additional content (e.g., a next book chapter, a next magazine article, a next day in a journal, a next thread in a forum, etc.).

Figure 2:
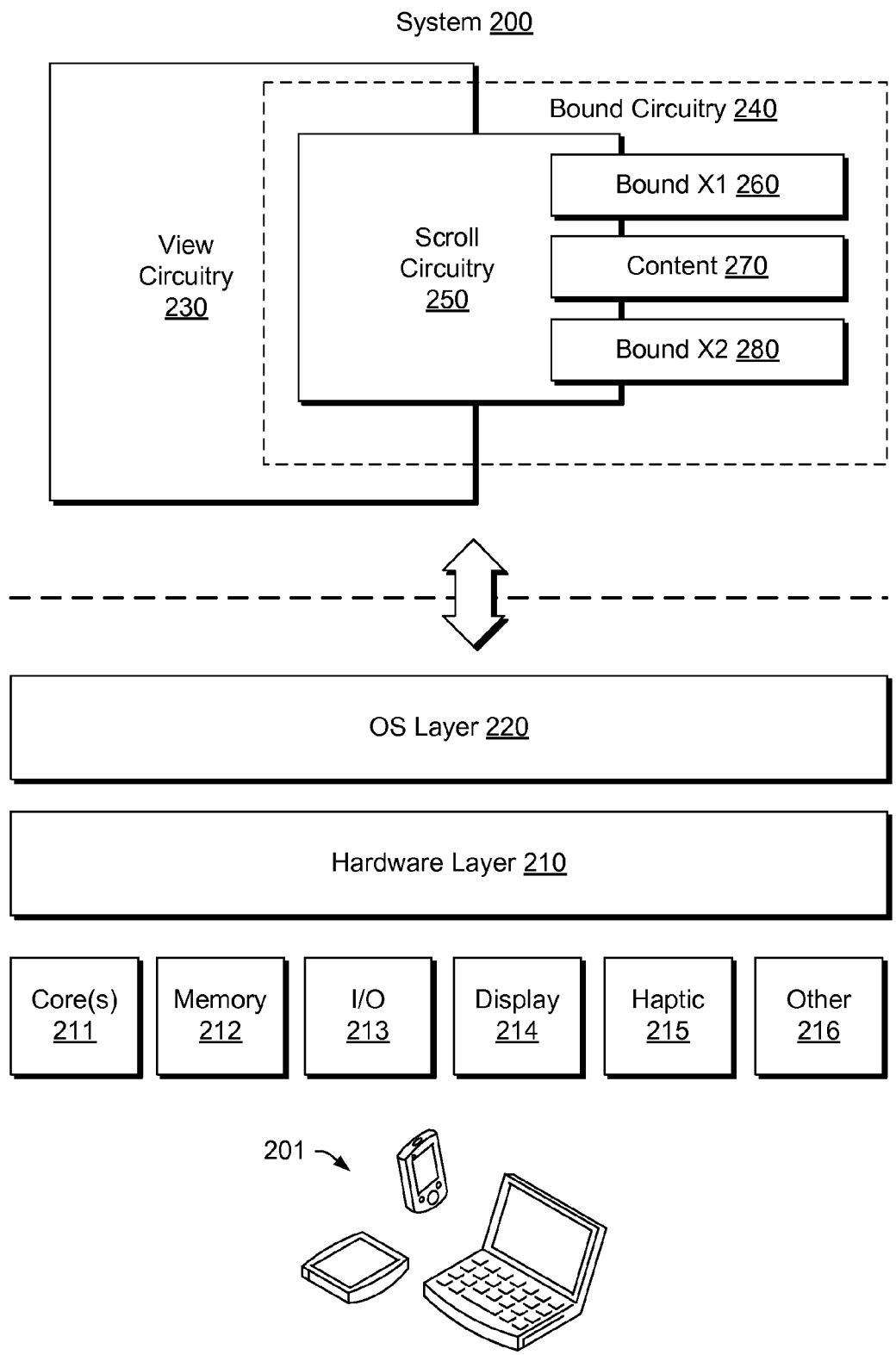
FIG. 2 is a diagram of an example of a system.

FIG. 2 shows an example of a system 200. The system 200 includes a hardware layer 210, an OS layer 220 and a layer with various circuitries such as view circuitry 230 and bound circuitry 240, which may include scroll circuitry 250. As an example, the view circuitry 230 and the bound circuitry 240 may interact with the OS layer 220 via one or more APIs (e.g., API calls, responses, etc.). As an example, the OS layer 220 may instruct the hardware layer 210. As an example, the hardware layer 210 may include one or more cores 211, memory 212, one or more interfaces 213, a display 214 (or displays), one or more haptic devices 215, and one or more other components 216. As an example, the system 200 may be a system of a device 201 such as a mobile phone device, a tablet device, a notebook computer device (e.g., optionally with a detachable tablet device), etc.

In the example of FIG. 2, the bound circuitry 240 includes bound X1 parameters 260, content parameters 270 and bound X2 parameters 280. As an example, a bound parameter may specify a shape of a bound graphic, a bound action, etc. For example, the bound X2 parameters 280 may include a pixel width parameter and a color parameter. As to the content parameters 270, these may comport with the view circuitry 230, for example, to specify an array (e.g., a pixel array) that may be available for viewing of content. As an example, the view circuitry 230 may include one or more grids. In such an example, the bound circuitry 240 may specify one or more parameter values with respect to a grid or grids.

As an example, with respect to a WINDOWS® framework, consider the following code:

```
<Window x:Class="AppX.MainWindow"
    xmlns="http://schemas.microsoft.com/winfx/20YY/xaml/presentation"
    xmlns:x="http://schemas.microsoft.com/winfx/20YY/xaml"
    xmlns:l="clr-namespace:AppX"
    Title="Window1" Loaded="Window_Loaded" Height="600"
    Width="800">
    <Grid>
        <Grid.RowDefinitions>
            <RowDefinition Height="100"/>
            <RowDefinition Height="*"/>
        </Grid.RowDefinitions>
        <ScrollViewer VerticalScrollBarVisibility="Auto"
            MinHeight="400"
Grid.Row="1">
            <ItemsControl>
                ...
                < * * * />
                ...
            </ItemsControl>
        </ScrollViewer>
    </Grid>
</Window>
```

The foregoing code, given as an example of certain technologies, implements a window control, a grid control and a scroll control as well as defines various parameter values related to such controls. The foregoing code references XAML, which is an extensible application markup language. In the WINDOWS® 8 framework, XAML elements map directly to Common Language Runtime object instances, while XAML attributes map to Common Language Runtime properties and events on those objects. In the WINDOWS® 8 framework, a ScrollViewer class includes a constructor (e.g., to initialize an instance of the ScrollViewer class), events, methods (e.g., including methods related to inertia), and properties. In the WINDOWS® 8 framework, a GridView class includes a constructor (e.g., to initialize an instance of the GridView class), events, methods and properties. In the example of FIG. 2, the view circuitry 230 may include one or more features of the aforementioned GridView class and the scroll circuitry 250 may include one or more features of the ScrollViewer class.

As an example, bound circuitry may include a scroll control (e.g., ScrollViewer control, etc.) within a grid control (e.g., a GridView control, etc.). In such an example, properties associated with the scroll control may include style (e.g., horizontal or vertical), name (e.g., "MainScrollViewer"), content (e.g., grid columns, grid rows, etc.). As an example, consider content properties for a grid control that includes 3 columns:

Column1: color bar 500 pixels wide (e.g., 10 pixels visible by setting a negative 490 pixel margin to cause display of the bar as being solid instead of a line when a user scrolls past a "beginning" bound of content);

Column2: Specific page content (e.g., optionally configured to changes for each "page" of content for an application); and Column3: color bar 500 pixels wide (e.g., 10 pixels visible by setting a negative 490 pixel margin to cause display of the bar as being solid instead of a line when a user scrolls past an "end" bound of content).

As an example, bound circuitry may include one or more parameters to specify values for properties such as inertia, snap back, etc. As an example, bound circuitry may adopt one or more property values from an application (e.g., or default settings) to provide a more uniform user experience (e.g., overall look, feel, etc.). As to color, bound circuitry may optionally adopt a color palette, scheme, etc., of an application to provide a more uniform user experience. For example, as to Columns 1 and 3 in the above-example, the color of the color bars may be selected to conform to an overall look of an application. As an example, bound circuitry may specify a color such as "red" where a closest match to "red" is selected from a color scheme of an application for use as a color of a color bar bound graphic. As another example, where an application calls for display of red (e.g., as a background color), bound circuitry may select a complementary color such as green (e.g., to enhance visual impact of a bound graphic).

Figure 3:
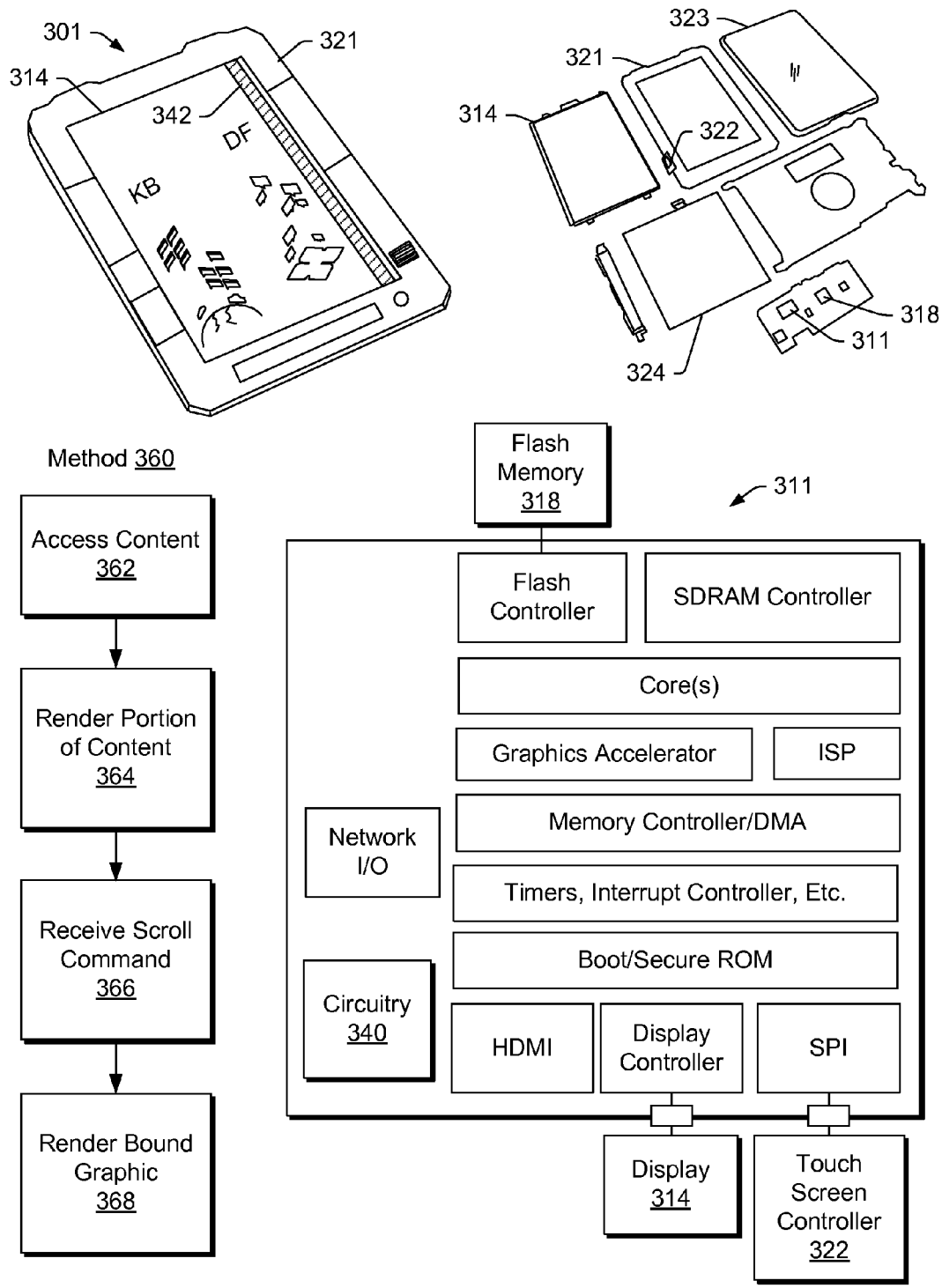
FIG. 3 is a diagram of an example of a system and an example of a method.

FIG. 3 shows an example of a device 301 and an example of a method 360, for example, which may be implemented by the device 301 or another device (e.g., consider one of the devices 201 of FIG. 2, the device 101 of FIG. 1, etc.). The device 301 includes a variety of components, some of which are shown in an exploded view. For example, the device 301 includes processing circuitry 311 that includes memory, a display 314, flash memory 318, a touch input mechanism 321 with a touch screen controller 322, a case component 323 and a battery 324. As an example, the display 314 may have a diagonal length of about 7 inches (e.g., about 180 mm) and a resolution of about 600 pixels by about 1024 pixels (e.g., about 160 dpi). The device 301 may include various navigation or control features such as buttons, a wheel, etc. As shown in the example of FIG. 3, the processing circuitry 311 can include a flash controller for control of the flash memory 318, a display controller for control of the display 314 and a serial peripheral interface bus (SPI) for interactions with the touch screen controller 322. Further, the device 301 includes bound circuitry 340, which may be implemented, for example, to call for one or more actions with respect to a bound or bounds of content. The bound circuitry 340 may be implemented as part of an application (e.g., executable code of an application), a plug-in, a feature of an operating system (e.g., accessible via an application API call or calls), etc. The bound circuitry 340 may respond to instructions stemming from, for example, the touch screen controller 322 and act to coordinate rendering of a bound graphic (e.g., and/or one or more other bound actions) with respect to rendering of content accessed from the flash memory 318 to the display 314 (e.g., at least in part by the graphics accelerator, etc., of the device 301).

In the example of FIG. 3, a portion of content is shown as being rendered to the display 314 along with a bound graphic 342. As an example, the flash memory 318 may store content such that the processing circuitry 311 can access one or more portions of the stored content responsive to one or more instructions input via the touch screen controller 322 and received via the SPI and display an accessed portion of the content to the display 314 (e.g., via the display controller). As an example, where the accessed portion of the content is adjacent to a bound of the content, the circuitry 340 of the device 301 may call for rendering of the bound graphic 342 and perform rendering of the bound graphic 342 to the display 314.

In the example of FIG. 3, the flash memory 318 may have a capacity, for example, in a range of megabytes to gigabytes. For example, a tablet device may include flash memory having a capacity of 8 GB. Where a user has subscriptions to many magazines, journal, etc., which may include detailed photographs (e.g., Vogue, Vanity Fair, etc.), the flash memory of a tablet device may become filled upon download of a few months of magazine issues. As an example, a user may have to delete downloaded content to load additional content. As another example, a user may download portions of content via a network where the portions are downloaded in chunks to memory. As illustrated by one or more of the foregoing examples, various manners exist for download and rendering of content for a tablet device.

As shown in FIG. 3, the method 360 includes an access block 362 for accessing content, a render block 364 for rendering a portion of the content, a receive block 366 for receiving a scroll command and a render block 368 for rendering a bound graphic, for example, responsive to receipt of a scroll command that calls for rendering content adjacent to a bound of the content.

As an example, a method can include accessing content stored in a data store where the content includes a bound and content adjacent to the bound; rendering a portion of the content to a display; receiving a scroll command that calls for rendering the content adjacent to the bound; and, responsive to receipt of the scroll command, rendering a bound graphic. In such an example, the bound graphic may be a colored bar (e.g., a vertical colored bar or a horizontal colored bar). As an example, a method can include accessing content stored in a data store via a network.

As an example, a method can include, responsive to receipt of a scroll command, rendering content adjacent to a bound bidirectionally with respect to time (e.g., for a snap visual effect). As an example, a method can include, responsive to receipt of a scroll command, issuing a control signal that initiates movement of a display (e.g., a device that includes a display). In such an example, the movement may notify the user that a bound of content has been reached responsive to receipt of a scroll command (e.g., to advance or reverse with respect to content).

As an example, content may be that of a webpage, an e-book, subscription content accessible via verification of a credential, etc.

As an example, a bound graphic may be a graphical user interface (GUI). In such an example, a method may include receiving a command via the graphical user interface to access additional content stored in a data store where the additional content includes a bound (e.g., of previously accessed content) and an additional bound and content adjacent to the additional bound.

As an example, where a bound graphic is rendered to a display, circuitry may provide for input of a command via voice, motion of the display, etc. For example, a method may include receiving a motion signal responsive to motion of a display and responsive to receipt of the motion signal accessing additional content (e.g., for rendering to the display per a prior received scroll command).

As an example, a device can include a touch display; memory; a processor operably coupled to the touch display and the memory; and instructions stored in the memory and executable by the processor to receive content, store the received content in ordered pages of the memory, render a portion of the stored content from the ordered pages of the memory to the touch display, receive a command that calls for rendering stored content from a last page of the ordered pages of the memory, and, responsive to receipt of the command, rendering the stored content from the last page to the display with a graphic that indicates content from the last page has been rendered to the display. In such an example, the command may be a command received via the touch display. As an example, a graphic may be a bar. As an example, a device may include haptic input circuitry where a command may be received via the haptic input circuitry.

As an example, one or more computer-readable storage media can include computer-executable instructions to instruct a computing system to: initiate a grid for structuring bounded content renderable to a display where the grid includes a first bound array for association with a first bound of the bounded content, a content array and a second bound array for association with a second bound of the bounded content; and initiate a scroll control for scrolling structured bounded content with respect to the content array of the grid, for rendering the first bound array of the grid in association with the first bound of the bounded content, and for rendering the second bound array of the grid in association with the second bound of the bounded content. In such an example, the first bound array may be a red bar, the second bound array may be a red bar or the first bound array and the second bound array may each be a red bar. As an example, instruction may be provided to initiate a grid with a first bound array and a second bound array horizontally or vertically.

Figure 4:
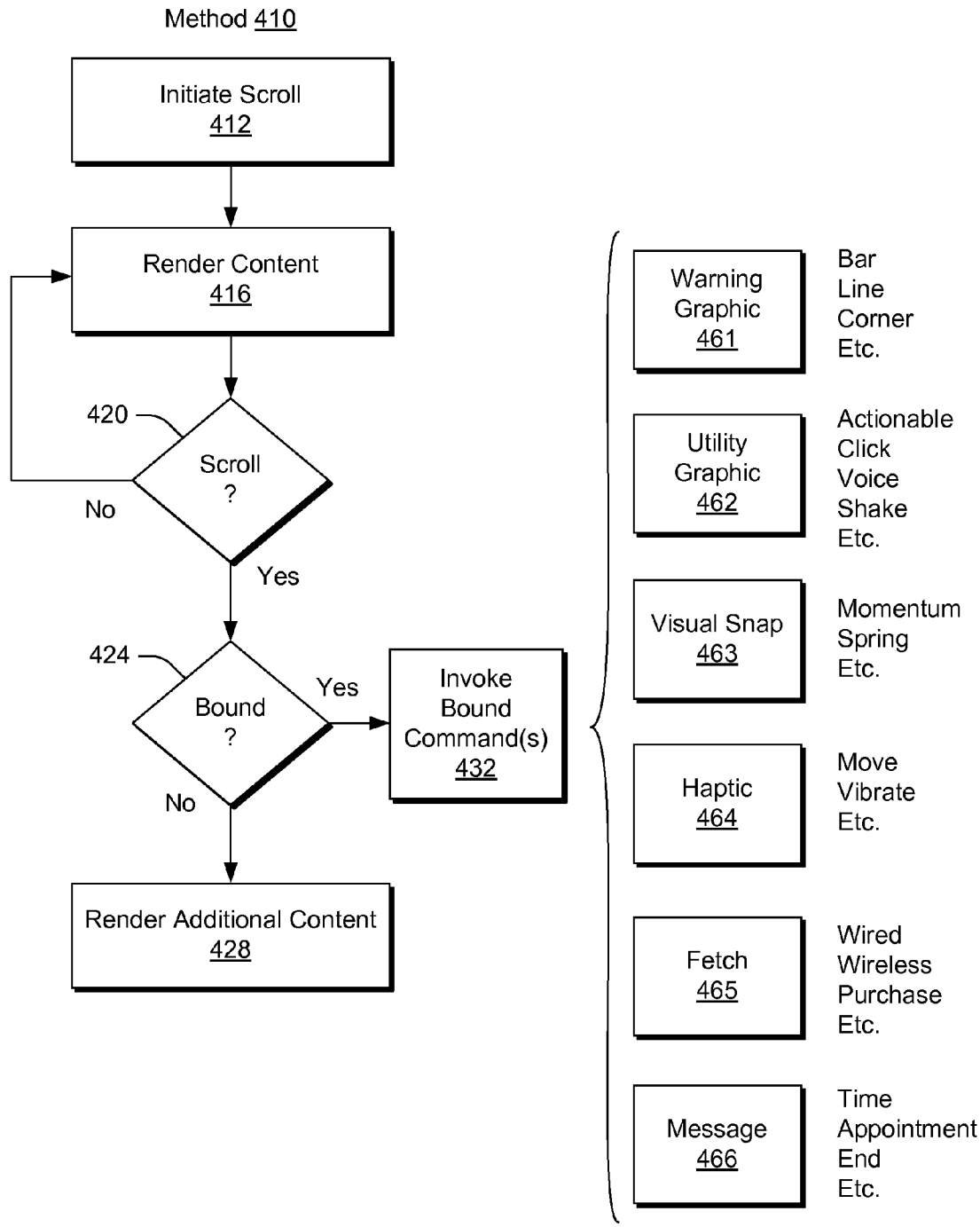
FIG. 4 is a diagram of an example of a method.

FIG. 4 shows an example of a method 410 that includes an initiate block 412 for initiating a scroll control, a render block 416 for rendering content, a decision block 420 for deciding whether a scroll command has been received, another decision block 424 for deciding whether a bound has been reached, a render block 428 for rendering additional content and an invocation block 432 for invoking one or more bound commands. As an example, where the decision block 420 decides that a scroll command has not been received, the method 410 can return to the render block 416. As an example, where the decision block 420 decides that a scroll command has been received, the method 410 may proceed to the decision block 424. Where the decision block 424 decides that a bound has not been reached, the method 410 may proceed to the render block 428, for example, to render additional content responsive to receipt of the scroll command (e.g., per the decision block 420). However, where the decision block 424 decides that a bound has been reached, the method 410 may proceed to the invocation block 432.

As shown in the example of FIG. 4, the invocation block 432 may invoke one or more bound commands such as a warning graphic command 461, a utility graphic command 462, a visual snap command 463, a haptic command 464, a fetch command 465, and/or a message command 466. As mentioned, where a bound command calls for rendering a graphic to a display, a method may optionally include accessing a color scheme associated with an application, for example, to harmonize an overall look for the application together with the graphic.

Figure 5:
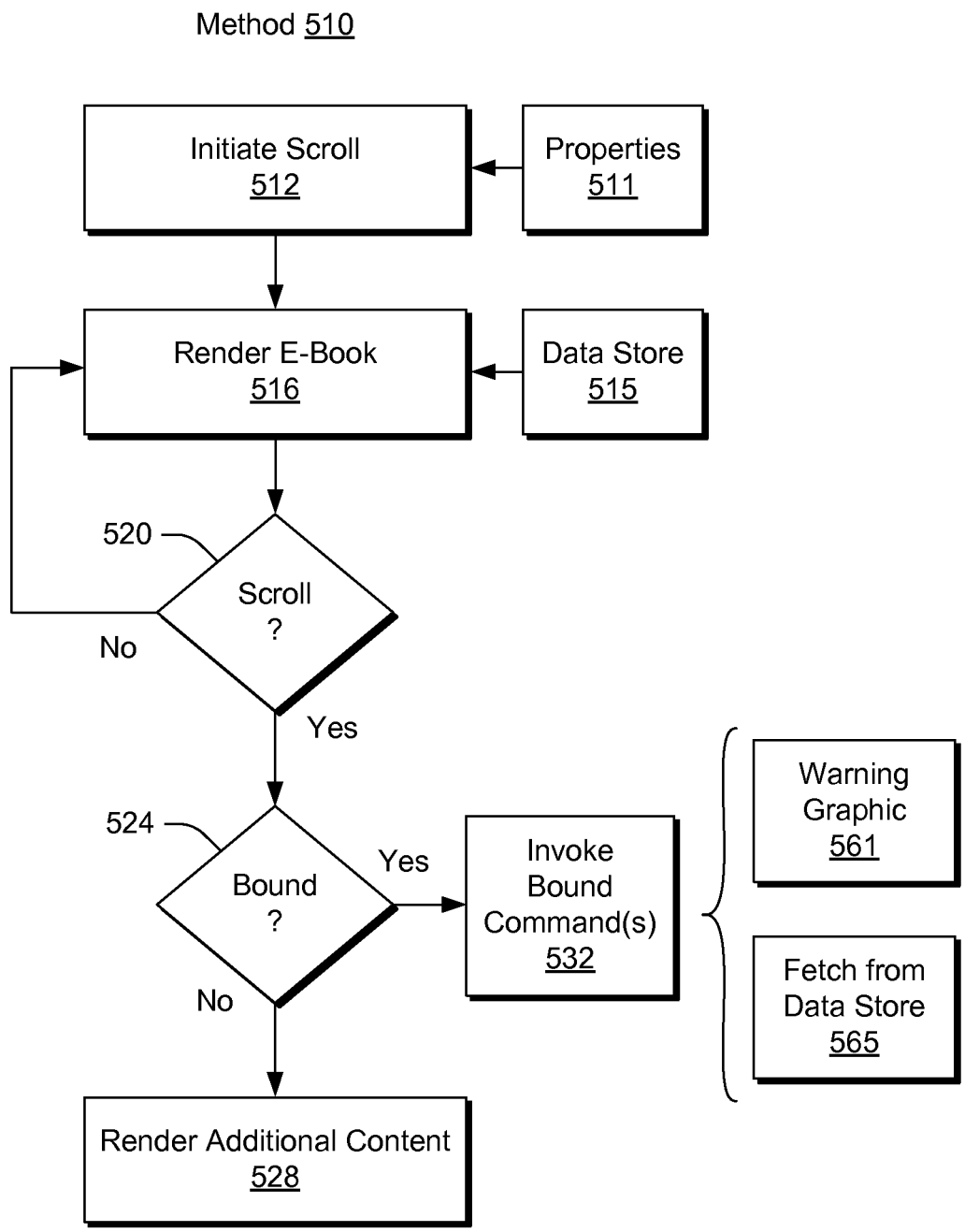
FIG. 5 is a diagram of an example of a method.

FIG. 5 shows an example of a method 510 that includes an initiate block 512 for initiating a scroll control according to one or more properties 511, a render block 516 for rendering e-book content as provided from a data store 515, a decision block 520 for deciding whether a scroll command has been received, another decision block 524 for deciding whether a bound has been reached, a render block 528 for rendering additional content and an invocation block 532 for invoking one or more bound commands. As an example, where the decision block 520 decides that a scroll command has not been received, the method 510 can return to the render block 516. As an example, where the decision block 520 decides that a scroll command has been received, the method 510 may proceed to the decision block 524. Where the decision block 524 decides that a bound has not been reached, the method 510 may proceed to the render block 528, for example, to render additional content responsive to receipt of the scroll command (e.g., per the decision block 520). However, where the decision block 524 decides that a bound has been reached, the method 510 may proceed to the invocation block 532.

As shown in the example of FIG. 5, the invocation block 532 may invoke one or more bound commands such as a warning graphic command 561 and/or a fetch command 565 for fetching additional content from the data store 515. As an example, the data store 515 may be a subscription data store accessible by a credential. In such an example, a bound command may be invoked that uses the credential, for example, if a network session with the data store has expired. For example, consider a command calling for issuance of a bound graphic such as a red bar. In response, a device may automatically or responsive to receipt of user input attempt to access additional content from a secure data store (e.g., requiring authentication via a password, a pin, a credential, etc.). As mentioned, a user input might be a shake that shakes the display such that an accelerometer, gyroscope or other sensor of the display (e.g., tablet device with a display) senses the shake and transmits a sensed signal or instruction to circuitry of the device to call for accessing additional content. As to an e-book, the additional content may be one or more additional pages of content, for example, pages of another chapter of a book, etc.

Figure 6:
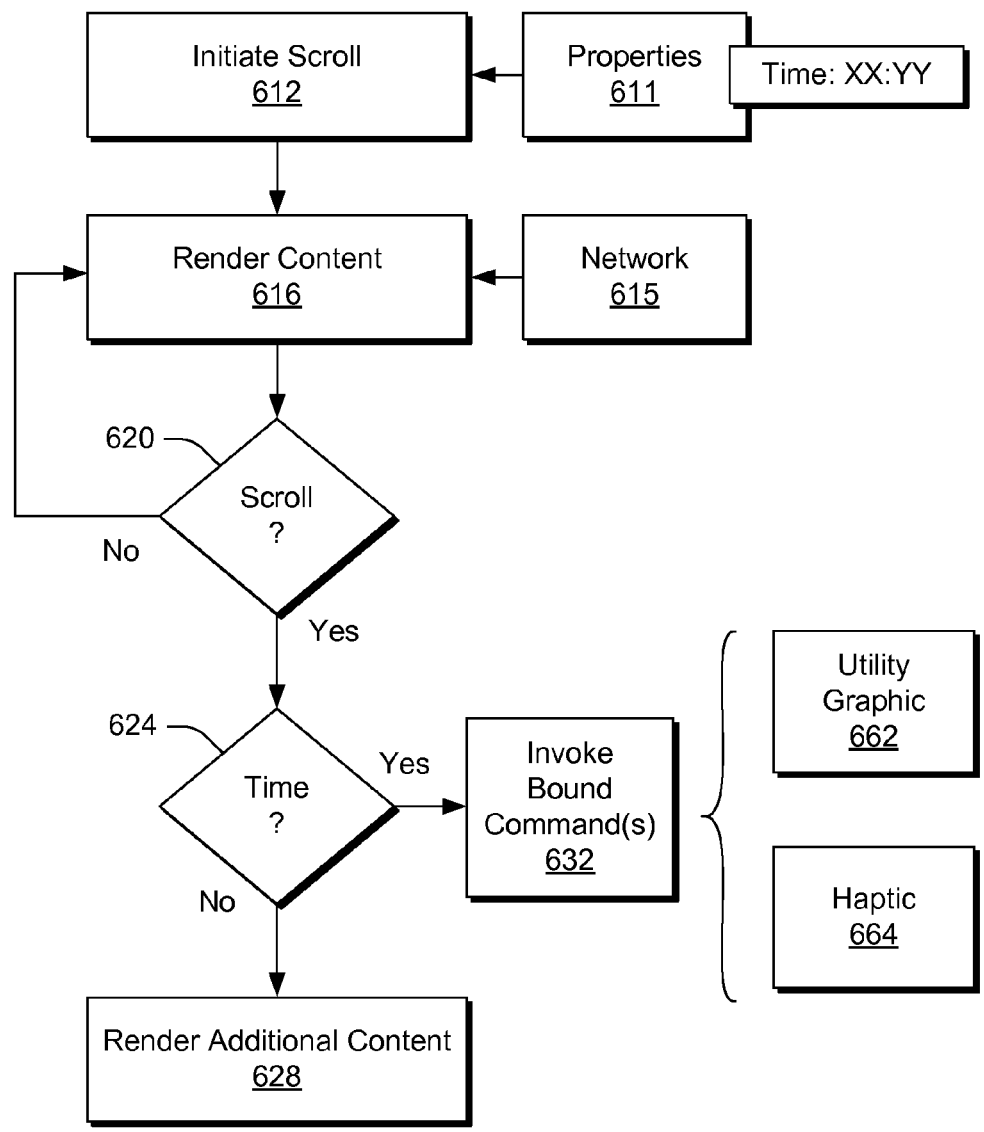
FIG. 6 is a diagram of an example of a method.

FIG. 6 shows an example of a method 610 that includes an initiate block 612 for initiating a scroll control according to one or more properties 611 (e.g., optionally include a time bound property), a render block 616 for rendering content as provided via a network 615, a decision block 620 for deciding whether a scroll command has been received, another decision block 624 for deciding whether a time bound has been reached, a render block 628 for rendering additional content and an invocation block 632 for invoking one or more bound commands. As an example, where the decision block 620 decides that a scroll command has not been received, the method 610 can return to the render block 616. As an example, where the decision block 620 decides that a scroll command has been received, the method 610 may proceed to the decision block 624. Where the decision block 624 decides that a time bound has not been reached, the method 610 may proceed to the render block 628, for example, to render additional content responsive to receipt of the scroll command (e.g., per the decision block 620). However, where the decision block 624 decides that a time bound has been reached (e.g., in comparison with a clock, a timer, etc.), the method 610 may proceed to the invocation block 632.

As shown in the example of FIG. 6, the invocation block 632 may invoke one or more bound commands such as a utility graphic command 662 and/or a haptic command 664 for issuing a signal to a haptic device, for example, which may vibrate, shift, etc., the display (e.g., a handheld tablet device with the display) to notify a user that a time bound has been reached. As an example, a time bound property may be a reading time, an appointment time, etc. Thus, in such a manner, a user may complete consumption (e.g., reading, viewing, etc.) of content currently being display without interruption. In such an example, when the user attempts to consume additional content, the time bound may invoke one or more commands. Such an example can be beneficial to a user's experience as well as network access, congestion, etc., as, if a user has an appointment, the device may avoid performing one or more actions that may be unrelated to the user's next course of action. For example, invocation of a time bound may notify a user and cause the device to enter a sleep or shut down state (e.g., within a few moments after issuance of the notification, for example, to allow a user to change his or her mind).

Figure 7:
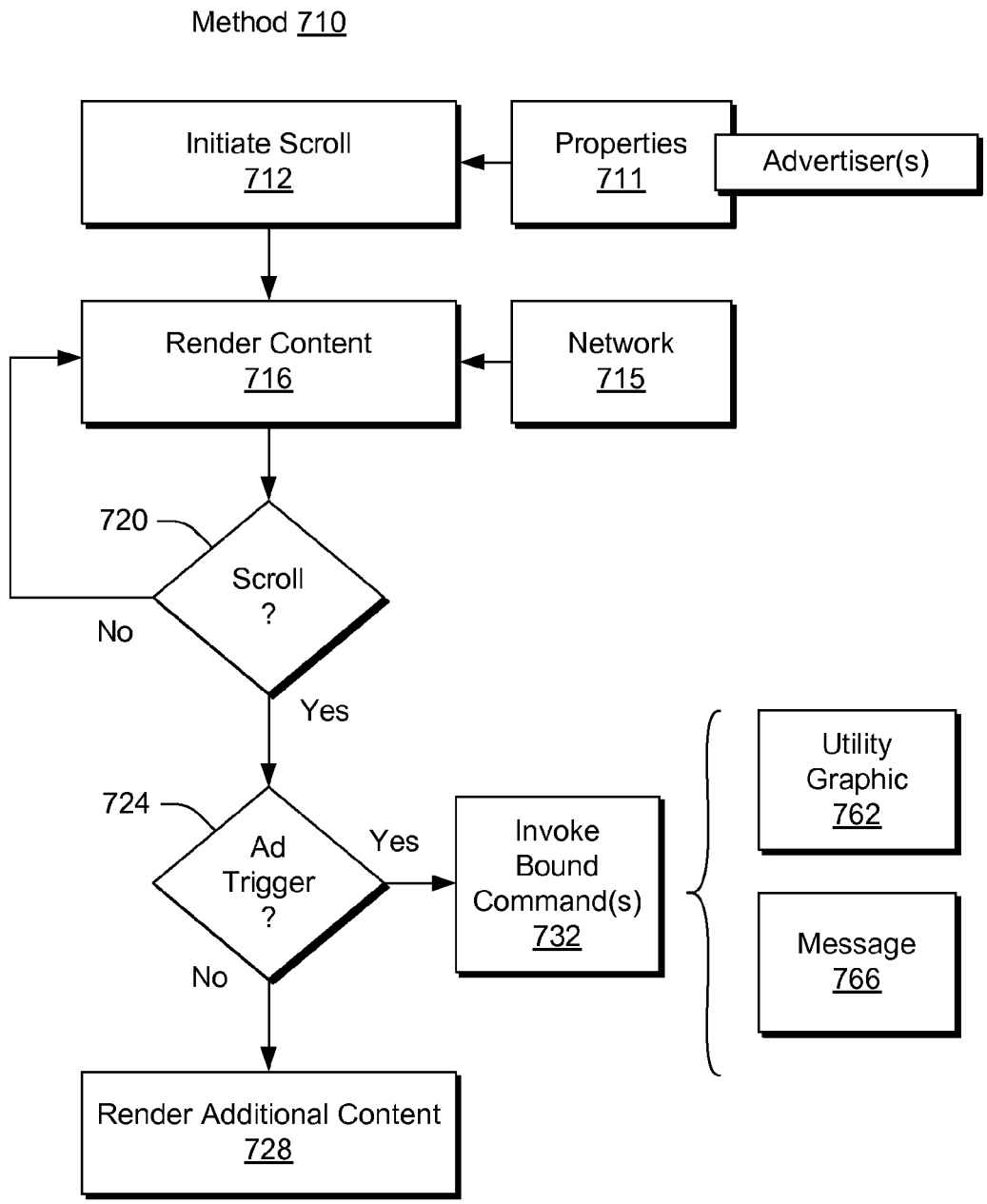
FIG. 7 is a diagram of an example of a method.

FIG. 7 shows an example of a method 710 that includes an initiate block 712 for initiating a scroll control according to one or more properties 711 (e.g., optionally include a property associated with one or more advertisers), a render block 716 for rendering content as provided via a network 715, a decision block 720 for deciding whether a scroll command has been received, another decision block 724 for deciding whether an advertisement trigger or bound has been reached, a render block 728 for rendering additional content and an invocation block 732 for invoking one or more bound commands. As an example, where the decision block 720 decides that a scroll command has not been received, the method 710 can return to the render block 716. As an example, where the decision block 720 decides that a scroll command has been received, the method 710 may proceed to the decision block 724. Where the decision block 724 decides that an advertisement trigger or bound has not been reached, the method 710 may proceed to the render block 728, for example, to render additional content responsive to receipt of the scroll command (e.g., per the decision block 720). However, where the decision block 724 decides that an advertisement trigger or bound has been reached (e.g., according to one or more properties, etc.), the method 710 may proceed to the invocation block 732.

As shown in the example of FIG. 7, the invocation block 732 may invoke one or more bound commands such as a utility graphic command 762 and/or a message command 766. As an example, content received via the network 715 may be subject to an agreement with one or more advertisers. As an example, the content may be portioned such that every X pages, every article, every chapter, etc., is interspersed with one or more advertisements. In the example of FIG. 7, the utility graphic command 762 may call for rendering an advertisement or may perform rendering of an advertisement, optionally with one or more utility graphic controls that may allow a user to input one or more actions associated with the advertisement (e.g., purchase product or service being advertised, access information associated with the advertisement such as a website, etc.). In the example of FIG. 7, the message command 766 may call for display of an advertiser message, for example, for a period of time or until a user provides input for a command to close the advertiser message, return to content consumption, etc.

In the example of FIG. 7, user experience may be enhanced as an advertisement may occur responsive to a scroll command, which calls for additional content. In such a manner, an advertisement may be rendered to a display with some assurance that a user has completed viewing, reading, etc., currently displayed content. Thus, the overall impact may be a short interruption to display an advertisement prior to display of additional content (e.g., as associated with the user's intention by activating the scroll control).

Figure 8:
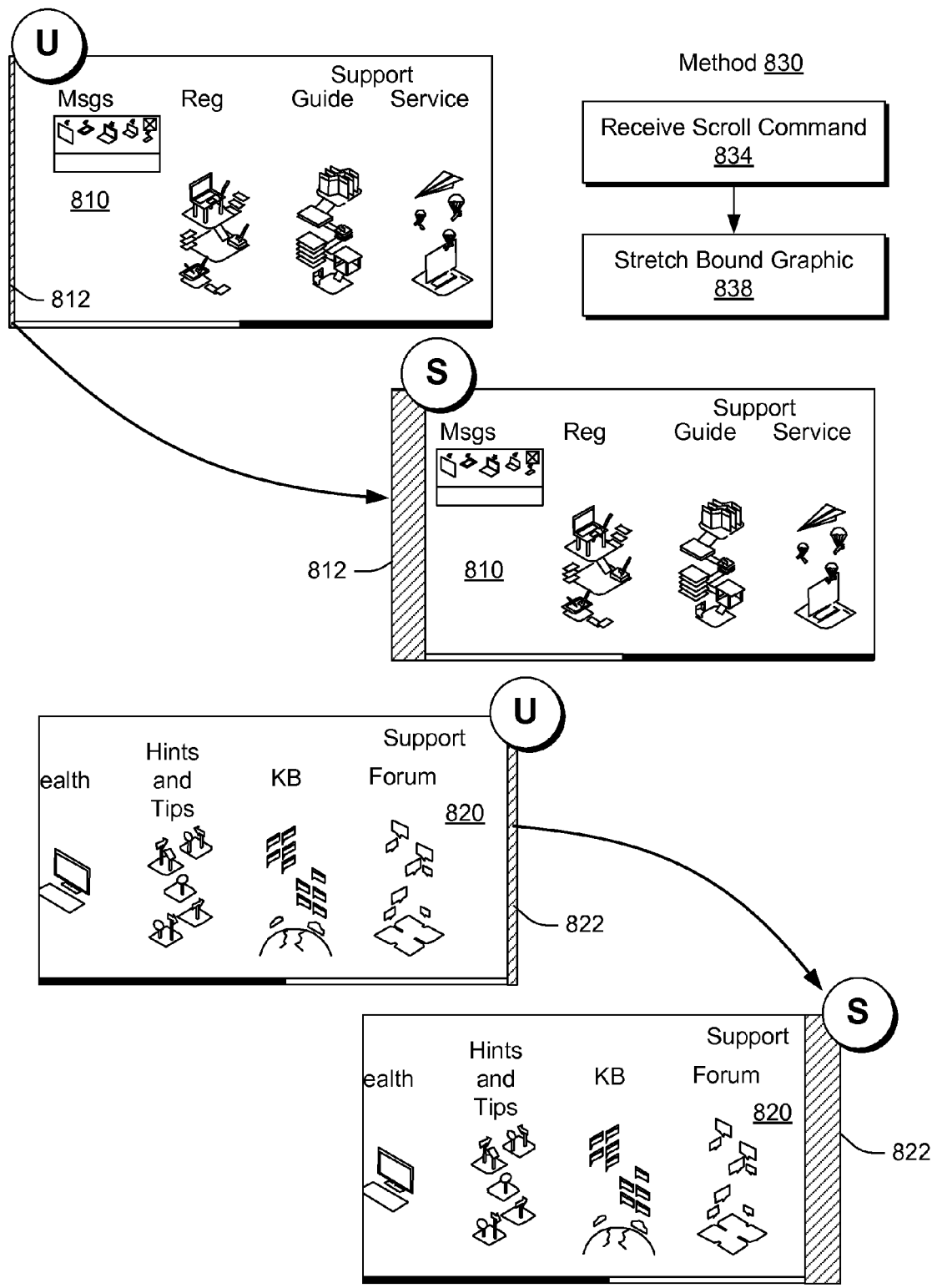
FIG. 8 is a diagram of an example of content and bound graphics along with an example of a method.

FIG. 8 shows an example of content adjacent to a bound 810 and a bound graphic 812 in an unstretched state (U) and a stretched state (S) and another example of content adjacent to a bound 820 and a bound graphic 822 in an unstretched state (U) and a stretched state (S). In the example of FIG. 8, the content 810 and 820 may be portions of content associated with, for example, a webpage, an application, a manual, etc.

FIG. 8 also shows an example of a method 830 that includes a reception block 834 for receiving a scroll command and a stretch block 838 for stretching a bound graphic responsive to receipt of a scroll command. Such a method may provide for stretching a bound graphic from an unstretched state (U) to a stretched state (S). For example, consider an application that calls for rendering of content to a display where the application includes bound circuitry to render red bookend bars along sides of a display area to indicate end of content (e.g., a beginning bound and an end bound). In such an example, the bound circuitry may include one or more stretch properties that call for stretching in response to a condition such as an attempt by a user to scroll past available content. Such properties may specify a width for a stretched state (e.g., a pixel width, a pixel width ratio, etc.), a rate for stretching (e.g., duration, etc.), momentum, inertia, etc.

In the example, the bound graphics 812 and 822 can provide a user with visual indication of bounds of an application interface that provides content (e.g., including the content 810 and 820). In such an example, a user can scroll or swipe to see if the application has more content to be displayed. The bound graphics 812 and 822 can serve as "bookends" (e.g., whether stretched or unstretched) to give visual notification to the user of the beginning, end, and/or sides of the content within an application. The bookends may be colored to show a distinct visual edge to the user. If the user attempts to swipe or scroll past a bookend, as an example, the bookend may "snap back" into place to give visual feedback to the user that the edge has been reached. For example, a stretched state may be temporary and achieved by a progressive widening of the bookend followed by a progressive thinning of the bookend (e.g., to a default or unstretched state).

As an example, bound graphics such as bookends may be used on top, bottom, left, and/or right side of an application. As an example, bookends may be square, rectangular, circular, polygonal, or other shapes to "enclose" an application (e.g., content bounds of content associated with the application).

As an example, a bound graphic (e.g., a bookend) may be clickable by a user to load additional content, for example, if available (e.g., and/or accessible). As an example, if a bookend is clickable, it may show an icon/overlay/alternate color to indicate that it can be expanded (e.g., drop down menu or other display technique). As an example, where selected, an application may call for accessing, loading, etc. of additional content, for example, adjacent to the existing content. In such an example, a bound graphic (e.g., a bookend or other type of graphic) may be configured to move to a new location for the newly loaded content. As an example, a bound graphic may automatically expand as content is loaded.

As an example, haptic feedback may be used to signal to a user that a bound (e.g., an end) is reached when attempting to scroll past a bound graphic such as a bookend. As an example, a bound graphic may be rendered to a display as a solid bar (see, e.g., the bound graphics 812 and 822 of FIG. 8) or, for example, it may show a line when the end is reached. Beyond a bookend, a graphic, text, different color, advertisement, etc. may be displayed as the bookend is "pulled" by the user. As an example, a bound graphic may be a bar (e.g., a red bar, etc.) that stretches to indicate to a user that a bound (e.g., an end) of content has been reached.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 9:
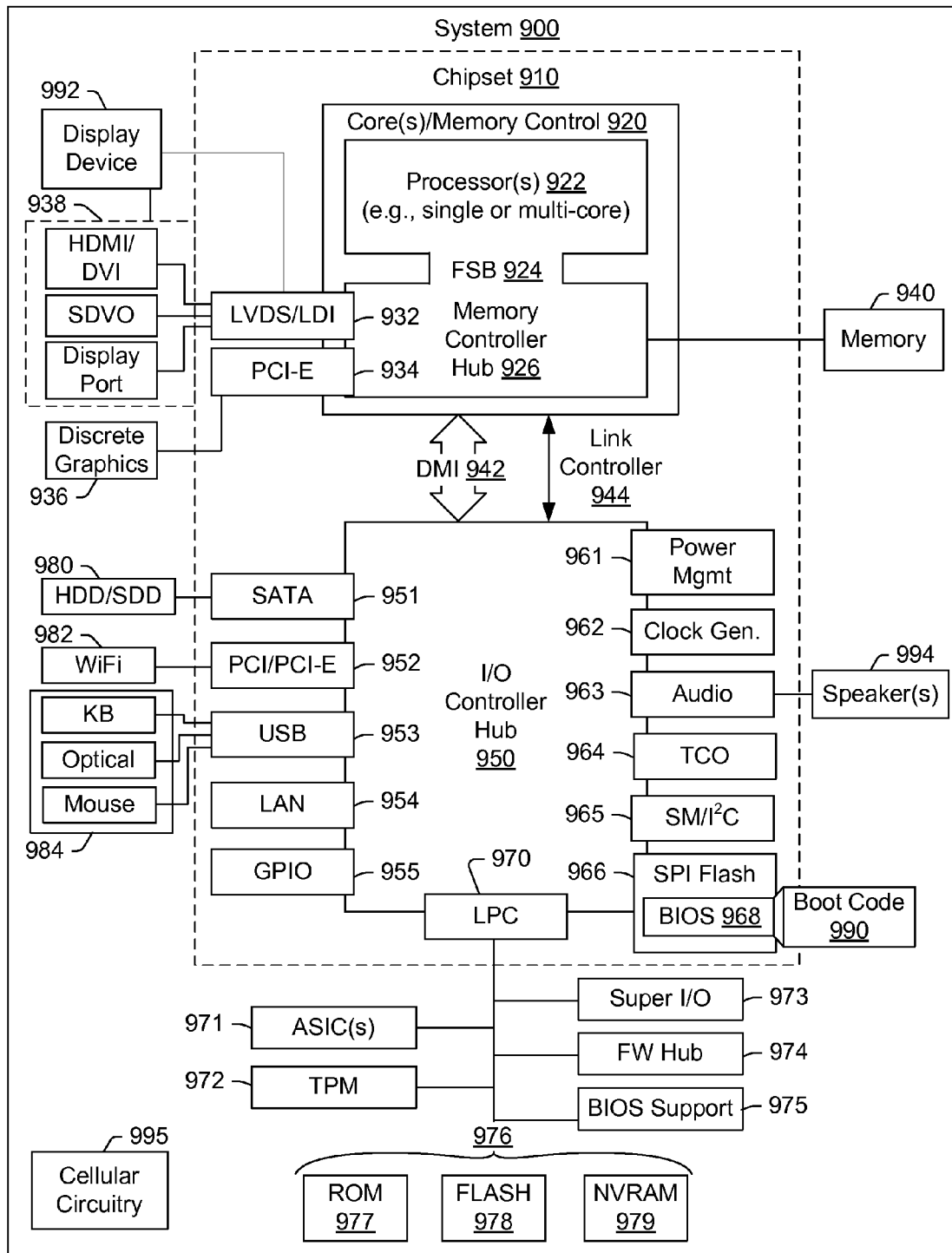
FIG. 9 is a diagram of an example of a system that includes one or more processors.

While various examples of circuits or circuitry have been discussed, FIG. 9 depicts a block diagram of an illustrative computer system 900. The system 900 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 900. As an example, a device such as one of the devices 201 of FIG. 2 may include at least some of the features of the system 900.

As shown in FIG. 9, the system 900 includes a so-called chipset 910. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 9, the chipset 910 has a particular architecture, which may vary to some extent depending on brand or manufacturer. The architecture of the chipset 910 includes a core and memory control group 920 and an I/O controller hub 950 that exchange information (e.g., data, signals, commands, etc.) via, for example, a direct management interface or direct media interface (DMI) 942 or a link controller 944. In the example of FIG. 9, the DMI 942 is a chip-to-chip interface (sometimes referred to as being a link between a "northbridge" and a "southbridge").

The core and memory control group 920 include one or more processors 922 (e.g., single core or multi-core) and a memory controller hub 926 that exchange information via a front side bus (FSB) 924. As described herein, various components of the core and memory control group 920 may be integrated onto a single processor die, for example, to make a chip that supplants the conventional "northbridge" style architecture.

The memory controller hub 926 interfaces with memory 940. For example, the memory controller hub 926 may provide support for DDR SDRAM memory (e.g., DDR, DDR2, DDR3, etc.). In general, the memory 940 is a type of random-access memory (RAM). It is often referred to as "system memory".

The memory controller hub 926 further includes a low-voltage differential signaling interface (LVDS) 932. The LVDS 932 may be a so-called LVDS Display Interface (LDI) for support of a display device 992 (e.g., a CRT, a flat panel, a projector, etc.). A block 938 includes some examples of technologies that may be supported via the LVDS interface 932 (e.g., serial digital video, HDMI/DVI, display port). The memory controller hub 926 also includes one or more PCI-express interfaces (PCI-E) 934, for example, for support of discrete graphics 936. Discrete graphics using a PCI-E interface has become an alternative approach to an accelerated graphics port (AGP). For example, the memory controller hub 926 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 950 includes a variety of interfaces. The example of FIG. 9 includes a SATA interface 951, one or more PCI-E interfaces 952 (optionally one or more legacy PCI interfaces), one or more USB interfaces 953, a LAN interface 954 (more generally a network interface), a general purpose I/O interface (GPIO) 955, a low-pin count (LPC) interface 970, a power management interface 961, a clock generator interface 962, an audio interface 963 (e.g., for speakers 994), a total cost of operation (TCO) interface 964, a system management bus interface (e.g., a multi-master serial computer bus interface) 965, and a serial peripheral flash memory/controller interface (SPI Flash) 966, which, in the example of FIG. 9, includes BIOS 968 and boot code 990. With respect to network connections, the I/O hub controller 950 may include integrated gigabit Ethernet controller lines multiplexed with a PCI-E interface port. Other network features may operate independent of a PCI-E interface.

The interfaces of the I/O hub controller 950 provide for communication with various devices, networks, etc. For example, the SATA interface 951 provides for reading, writing or reading and writing information on one or more drives 980 such as HDDs, SDDs or a combination thereof. The I/O hub controller 950 may also include an advanced host controller interface (AHCI) to support one or more drives 980. The PCI-E interface 952 allows for wireless connections 982 to devices, networks, etc. The USB interface 953 provides for input devices 984 such as keyboards (KB), one or more optical sensors, mice and various other devices (e.g., microphones, cameras, phones, storage, media players, etc.). On or more other types of sensors may optionally rely on the USB interface 953 or another interface (e.g., I$^2$C, etc.). As to microphones, the system 900 of FIG.

9 may include hardware (e.g., audio card) appropriately configured for receipt of sound (e.g., user voice, ambient sound, etc.).

In the example of FIG. 9, the LPC interface 970 provides for use of one or more ASICs 971, a trusted platform module (TPM) 972, a super I/O 973, a firmware hub 974, BIOS support 975 as well as various types of memory 976 such as ROM 977, Flash 978, and non-volatile RAM (NVRAM) 979. With respect to the TPM 972, this module may be in the form of a chip that can be used to authenticate software and hardware devices. For example, a TPM may be capable of performing platform authentication and may be used to verify that a system seeking access is the expected system.

The system 900, upon power on, may be configured to execute boot code 990 for the BIOS 968, as stored within the SPI Flash 966, and thereafter processes data under the control of one or more operating systems and application software (e.g., stored in system memory 940). An operating system may be stored in any of a variety of locations and accessed, for example, according to instructions of the BIOS 968. Again, as described herein, a satellite, a base, a server or other machine may include fewer or more features than shown in the system 900 of FIG. 9. Further, the system 900 of FIG. 9 is shown as optionally include cell phone circuitry 995, which may include GSM, CDMA, etc., types of circuitry configured for coordinated operation with one or more of the other features of the system 900. Also shown in FIG. 9 is battery circuitry 997, which may provide one or more battery, power, etc., associated features (e.g., optionally to instruct one or more other components of the system 900), as well as mass shift circuitry 999 (e.g., to receive one or more signals to shift a mass, to latch a mass, etc., such as a battery mass or a batteries mass). As mentioned, a SMBus may be operable via a LPC (see, e.g., the LPC interface 970), via an I$^2$C interface (see, e.g., the SM/I$^2$C interface 965), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
   accessing content stored in a data store wherein the content comprises a bound and content adjacent to the bound;
   rendering a portion of the content to a display within a content column of a grid that comprises a grid height and a grid width wherein the content column comprises a left side and a right side;
   receiving a scroll command for scrolling toward the right side of the content column that calls for rendering the content adjacent to the bound;
   responsive to receipt of the scroll command, rendering a bound graphic to the display within a bound column of the grid wherein the bound graphic comprises a graphical user interface; and
   receiving a command via the graphical user interface to access additional content stored in the data store.

2. The method of claim 1 wherein the bound graphic comprises a colored bar.

3. The method of claim 2 wherein the colored bar comprises a vertical colored bar or a horizontal colored bar.

4. The method of claim 1 wherein the accessing content stored in a data store comprises accessing the content via a network.

5. The method of claim 1 comprising, responsive to receipt of the scroll command, rendering the content adjacent to the bound bidirectionally with respect to time.

6. The method of claim 1 comprising, responsive to receipt of the scroll command, issuing a control signal that initiates movement of the display.

7. The method of claim 1 wherein the content comprises a webpage.

8. The method of claim 1 wherein the content comprises an e-book.

9. The method of claim 1 wherein the content comprises subscription content accessible via verification of a credential.

10. The method of claim 1 wherein the additional content comprises the bound and an additional bound and content adjacent to the additional bound.

11. The method of claim 1 comprising receiving a motion signal responsive to motion of the display and responsive to receipt of the motion signal accessing additional content.

12. The method of claim 1 wherein the display comprises a touch display and wherein receiving a scroll command for scrolling toward the right side of the content column comprises detecting, via the touch display, touch associated with a swiping motion in the content column.

13. A device comprising:
   a touch display;
   memory;
   a network interface;
   a processor operably coupled to the touch display, the memory and the network interface; and
   instructions stored in the memory and executable by the processor to
   receive content via the network interface,
   store the received content in ordered pages of the memory,
   render a portion of the stored content from the ordered pages of the memory to the touch display within a content column of a grid that comprises a grid height and a grid width wherein the content column comprises a left side and a right side,
   receive a command for scrolling toward the right side of the content column that calls for rendering stored content from a last page of the ordered pages of the memory,
   responsive to receipt of the command, render the stored content from the last page to the touch display with a bound graphic within a bound column of the grid that indicates content from the last page has been rendered to the touch display wherein the bound graphic comprises a graphical user interface, and
   receive an access command via the graphical user interface to access additional content via the network interface and to store the received additional content in ordered pages of the memory.

14. The device of claim 13 wherein the command comprises a command received via the touch display.

15. The device of claim 13 comprising haptic input circuitry wherein the command comprises a command received via the haptic input circuitry.

16. The device of claim 13 wherein the graphic comprises a bar.

17. One or more non-transitory computer-readable storage media comprising computer-executable instructions to instruct a computing system to:
   initiate a grid for structuring bounded content renderable to a display wherein the grid comprises a grid height, a grid width, a left side, a right side, a first bound array as a left side column of the grid for association with a first bound of the bounded content, a content array and a second bound array as a right side column of the grid for association with a second bound of the bounded content; and
   initiate a scroll control for scrolling structured bounded content with respect to the content array of the grid, for rendering the first bound array of the grid as a left side column of the grid in association with the first bound of the bounded content, and for rendering the second bound array of the grid as a right side column of the grid in association with the second bound of the bounded content.

18. The one or more non-transitory computer-readable storage media of claim 17 wherein the first bound array comprises a red bar.

19. The one or more non-transitory computer-readable storage media of claim 17 wherein the second bound array comprises a red bar.

20. The one or more non-transitory computer-readable storage media of claim 17 wherein the display comprises a touch display and wherein to initiate a scroll control for scrolling structured bounded content with respect to the content array of the grid comprises, via the touch display, detection of touch associated with a swiping motion in the content column.

\* \* \* \* \*